US008549008B1

(12) United States Patent
Wang et al.

(10) Patent No.: US 8,549,008 B1
(45) Date of Patent: Oct. 1, 2013

(54) DETERMINING SECTION INFORMATION OF A DIGITAL VOLUME (75) Inventors: Xuefu Wang, Los Altos, CA (US); Raghavan Manmatha, Belchertown, MA (US); Bo Pang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1000 days.

(21) Appl. No.: 12/269,421

(22) Filed: Nov. 12, 2008

Related U.S. Application Data (60) Provisional application No. 60/987,550, filed on Nov. 13, 2007.

(51) Int. Cl.
*G06F 7/00* (2006.01)
(52) U.S. Cl.
USPC .......................................... 707/741; 707/758
(58) Field of Classification Search
USPC .................... 707/709–711, 741, 758
See application file for complete search history.

(56) References Cited

U.S. PATENT DOCUMENTS

| | | | | |
|---|---|---|---|---|
| 5,813,009 A | * | 9/1998 | Johnson et al. | 707/695 |
| 6,950,821 B2 | * | 9/2005 | Faybishenko et al. | 707/688 |
| 7,725,422 B2 | * | 5/2010 | Ryan et al. | 1/1 |
| 7,844,594 B1 | * | 11/2010 | Holt et al. | 707/709 |
| 7,991,778 B2 | * | 8/2011 | Hull et al. | 707/741 |
| 2005/0028075 A1 | * | 2/2005 | Harrington et al. | 715/500 |
| 2005/0060643 A1 | * | 3/2005 | Glass et al. | 715/501.1 |
| 2005/0270856 A1 | * | 12/2005 | Earhart et al. | 365/189.05 |
| 2006/0011720 A1 | * | 1/2006 | Call | 235/383 |
| 2006/0143307 A1 | * | 6/2006 | Codignotto | 709/246 |
| 2006/0288842 A1 | * | 12/2006 | Sitrick et al. | 84/477 R |
| 2007/0112839 A1 | * | 5/2007 | Bjarnestam et al. | 707/102 |
| 2007/0118557 A1 | * | 5/2007 | Arnold et al. | 707/104.1 |
| 2008/0077570 A1 | * | 3/2008 | Tang et al. | 707/5 |

\* cited by examiner

*Primary Examiner* — James Trujillo
*Assistant Examiner* — Linh Black
(74) *Attorney, Agent, or Firm* — Fenwick & West LLP (57) ABSTRACT

A system, method, and computer program determines section information of a digital volume. Digital volumes include digital representations of human-readable content, such as digitized books. Phrases are extracted from a table of contents of a digital volume. Matching phrases that at least approximately match the extracted phrases are identified in the body of the digital volume. A best matching phrase is determined for each extracted phrase based on the ordering of the extracted phrases and the matching phrases, and based on match scores indicating the quality of the matches. Section information is generated, including section headings and section start locations based on the best matching phrases. The digital volume is presented to users with links from the table of contents to the section headings on the section start pages. The section information is also used to enhance searching of the digital volume by users.

27 Claims, 5 Drawing Sheets

DETERMINING SECTION INFORMATION OF A DIGITAL VOLUME

CROSS-REFERENCE TO RELATED APPLICATIONS

This application claims the benefit of U.S. Provisional Application No. 60/987,550, filed Nov. 13, 2007, which is hereby incorporated in its entirety by reference.

FIELD OF THE INVENTION

This invention relates generally to processing digital volumes and determining information about their structure.

BACKGROUND

A digital volume is a volume stored on an electronic device such as a computer. Volumes include, for example, digitized books and magazines. A user can read the digital volume on the electronic device, and navigate through the volume in various ways, such as by paging forward or jumping to a particular page. The digital volume may have certain sections, such as a table of contents, an index, and several chapters. The user may wish to quickly navigate to one of these sections, such as to a particular chapter. The user may also wish to be able to select (e.g. with a pointing device) a chapter listed in the table of contents and automatically navigate to the selected chapter.

Though the digital volume may have sections that are easily identifiable by a human reader, these sections may not be immediately known to the electronic device. For example, a book that was scanned from a printed source may consist of merely a sequence of page images without any semantic information or metadata identifying sections of the book or the content of the pages. As a result, the user may not be able to navigate to a particular section as described above. Therefore, there is a need in the art for a way to determine section information of a digital volume.

SUMMARY

The above need is met by a system, method, and computer program product for determining section information of a digital volume. Digital volumes include digital representations of human-readable content, such as digitized books. Phrases are extracted from a table of contents of a digital volume. Matching phrases that at least approximately match the extracted phrases are identified in the body of the digital volume. A best matching phrase is determined for each extracted phrase based on the ordering of the extracted phrases and the matching phrases, and based on match scores indicating the quality of the matches. Section information is generated, including section headings and section start locations based on the best matching phrases. The digital volume is presented to users with links from the table of contents to the section headings on the section start pages. The section information is also used to enhance searching of the digital volume by users.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
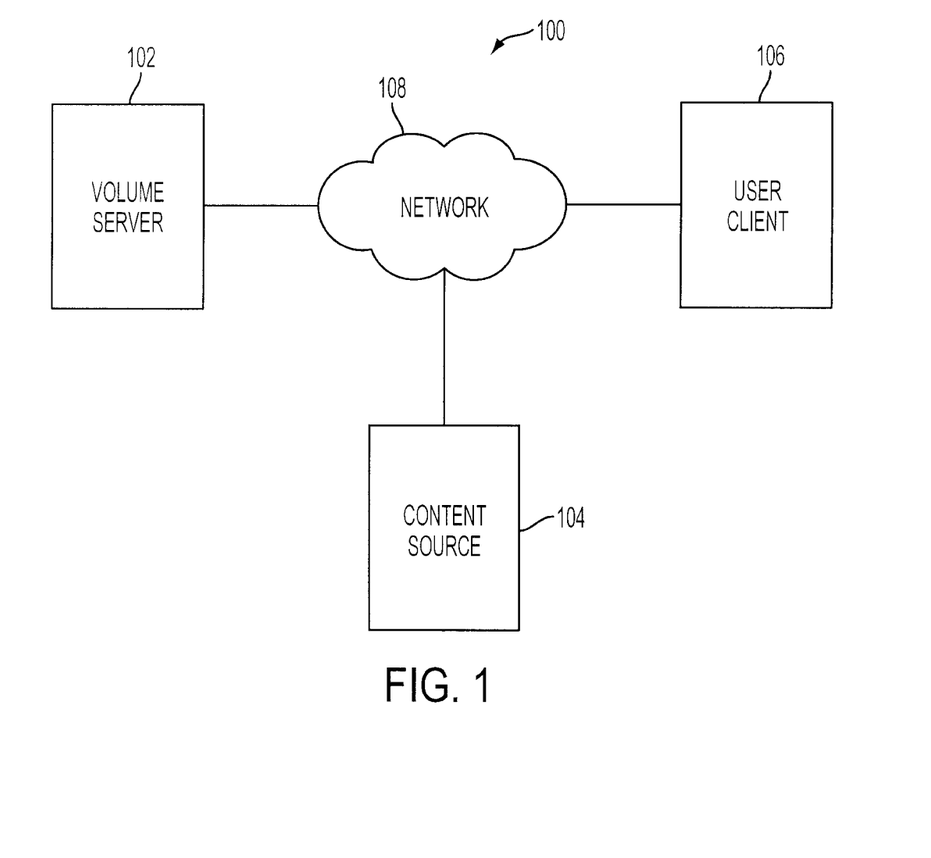
FIG. 1 is a high-level diagram illustrating an environment for determining section information of digital volumes, in one embodiment.

FIG. 1 is a high-level diagram illustrating an environment 100 for determining section information of digital volumes, in one embodiment. The environment 100 includes a volume server 102, a content source 104, and a user client 106. The content source 104 supplies digital volumes that are presented to a user at a user client 106 by the volume server 102. The volume server 102, content source 104, and user client 106 can communicate through a network 108 such as the Internet. Although only one user client 106 and content source 104 are shown in the environment 100, there may be many. Also, some of the entities of the environment 100 may be combined into a single entity. For example, the volume server 102 and content source 104 may be combined.

The digital volumes provided by the content source 104 include digital representations of human-readable content, such as digitized books or digitized magazines. These digital volumes may be created by scanning printed volumes with a scanning device. The digital volumes may also have been originally created electronically, for example in a word processing program. A digital volume may comprise a set of graphical images representing each page of the volume and may include an ordering of the pages.

The volume server 102 allow a user at a user client 106 to view or search digital volumes. The volume server 102 can include a web server for presenting digital volumes to the user through a web browser on the user client 106. The volume server 102 processes the digital volumes received from the content source 104 to make the digital volumes easier to navigate by the user. This processing can include determining section information for each digital volume. Sections are any type of division or structural component of a digital volume, such as a chapter or part. Section information includes section boundary information, such as the starting pages of each section. Section information also can include section headings (e.g., chapter titles). This processing by the volume server 102 can also include identifying, or classifying, certain pages of digital volumes as table of contents (TOC) pages. Although the term "TOC pages" is used in the description below, the pages can be any pages that reference portions of the book such as index pages or table of authorities pages.

The volume server 102 can use section information to provide improved user interaction with the digital volumes. With section boundary information, the volume server 102 can present controls to the user for quickly navigating through sections of the digital volume. The volume server 102 can also create links from the TOC to the various sections, allowing a user to select a link in the TOC with a pointing device to quickly navigate to the selected section.

The volume server 02 can also use section information to return more relevant results to user searches (e.g., keyword searches) of digital volumes.

The user client 106 comprises a computing device that can receive user input and can transmit and receive data via the network 108. For example, a user client 106 may be a desktop computer, laptop computer, smart phone, e-book reader, personal digital assistant (PDA), or any other device including computing functionality and data communication capabilities. A user at the user client 106 can view or search digital volumes provided by the volume server 102. A web browser running on the user client 106 can provide a graphical interface for viewing the digital volume. If the section information has been determined, the user can navigate through sections of the digital volume as described above.

Figure 2:
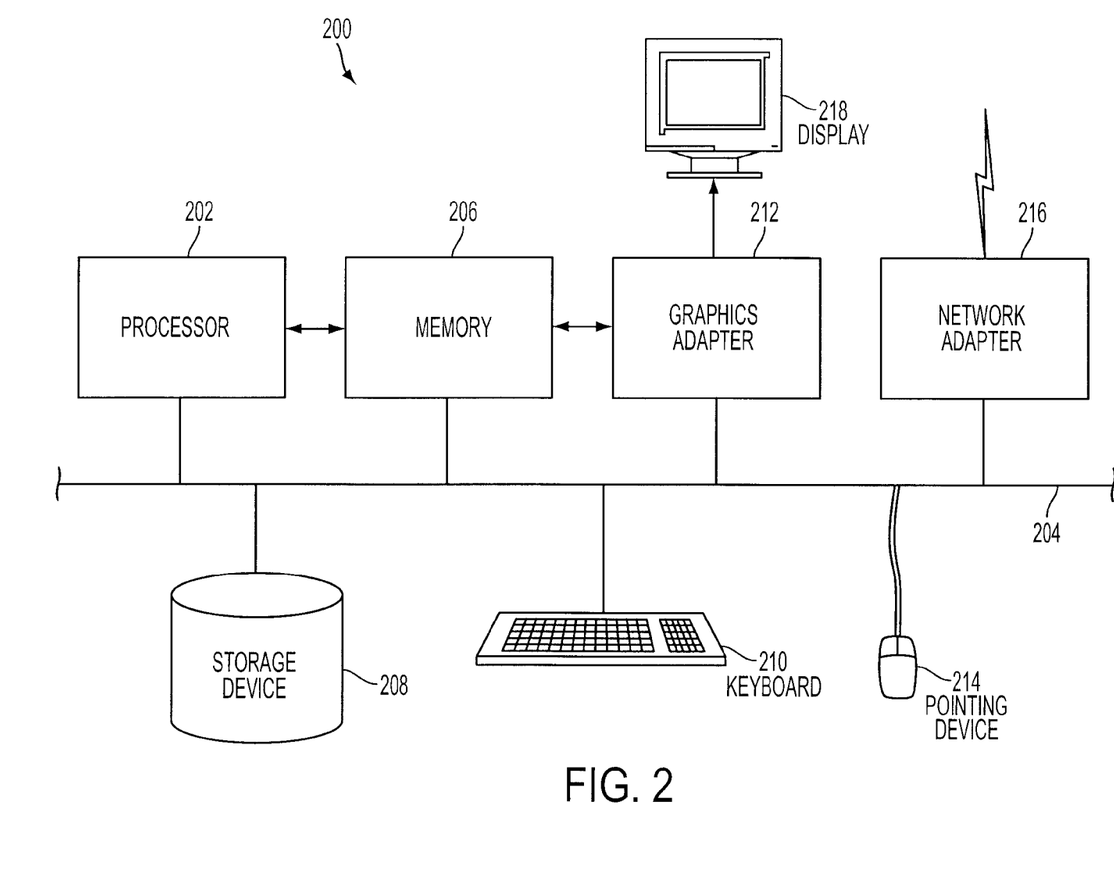
FIG. 2 is a block diagram illustrating a computer that can serve as an embodiment of a volume server, a content source, or a user client, in one embodiment.

FIG. 2 is a block diagram illustrating a computer 200 that can serve as an embodiment of a volume server 102, a content source 104, or a user client 106, in one embodiment. Illustrated are at least one processor 202 coupled to a bus 204. Also coupled to the bus are a memory 206, a storage device 208, a keyboard 210, a graphics adapter 212, a pointing device 214, and a network adapter 216. A display 218 is coupled to the graphics adapter 212. The storage device 208 comprises a computer-readable medium and can be a device such as a hard drive, CD or DVD drive, or flash memory device, and holds files containing executable code and/or data utilized during the operation of the computer 200. The memory 206, in one embodiment, is a random access memory (RAM) and holds instructions and data loaded from the storage device 208, generated during processing, and/or from other sources.

Computers acting in different roles may have different and/or additional elements than the ones shown in FIG. 2. For example, a computer 200 acting as a volume server 102 may have greater processing power and a larger storage device than a computer acting as a user client 106. Likewise, a computer 200 acting as an volume server 102 may lack devices such as a display 218 and/or keyboard 210 that are not necessarily required to operate it.

The computer 200 executes one or more operating systems such as a variant of MICROSOFT WINDOWS or LINUX. In general, the operating system executes one or more application programs. The operating system and application programs executed by the computer are formed of one or more processes. This description utilizes the term "module" to refer to computer program logic for providing a specified functionality. A module can be implemented in hardware, firmware, and/or software. A module is typically stored on the storage device 208 as a computer program product, loaded into the memory 206, and executed by the processor 202. A module can include one or more processes, and/or be provided by only part of a process.

Figure 3:
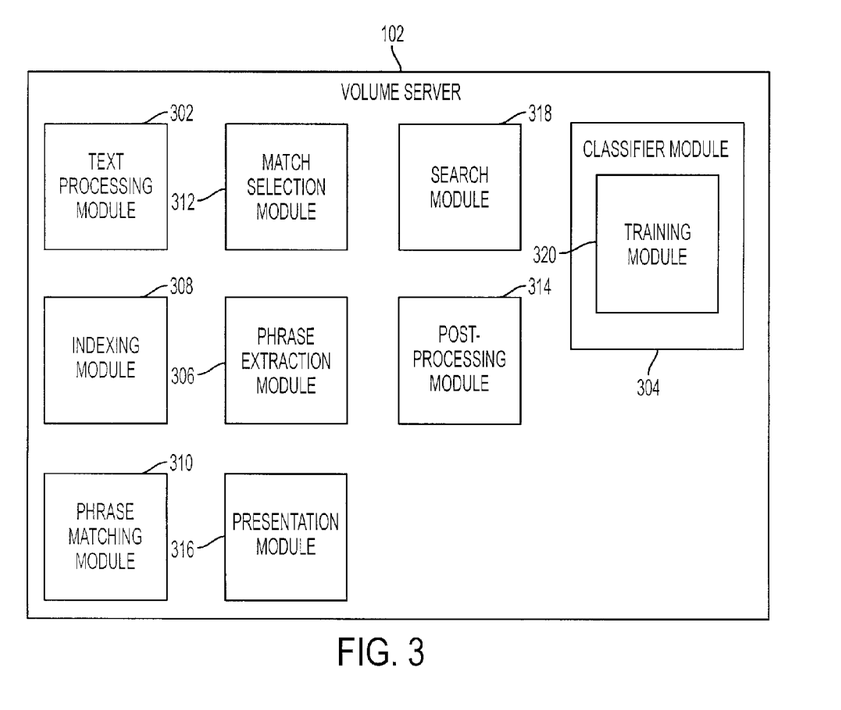
FIG. 3 is a block diagram illustrating the components of a volume server, in one embodiment.

FIG. 3 is a block diagram illustrating the components of a volume server 102, in one embodiment. As mentioned above, the volume server 102 receives digital volumes from the content source 104 and processes the digital volumes, including determining section information. The volume server 102 then presents the digital volumes to users and executes searches over the digital volumes.

The text processing module 302 determines text information from the digital volume. The text information includes the text characters and associated information such as font and layout. The text processing module 302 performs optical character recognition (OCR) on page images of the digital volume to determine text information, in one embodiment. The OCR uses various algorithms to convert images to text (e.g., character strings) that can be more easily processed. The OCR can also determine fonts and layouts of the text, including the location of text on the page and the amount of whitespace surrounding the text. The text information determined by the text processing module 302 can be attached to the digital volume for use by other modules of the volume server 102. Some digital volumes received from the content source 104 may already include text, font, and layout information (e.g., a document in HyperText Markup Language) and may not need to undergo OCR. In this case, the text information may be more simply determined from the digital volume.

The OCR may occasionally generate incorrect text or other information from page images. One possible reason is that the page images are of poor quality due to imperfect scanning. Other possible reasons are imperfections in the OCR algorithms or unusual fonts or characters in a digital volume that are not anticipated by the OCR algorithms. The possibility of these errors is taken into account by other modules of the volume server 102 as described below.

The classifier module 304 determines which pages of the digital volume are TOC pages (i.e., classifies certain pages as TOC pages). TOC pages are pages that make reference to sections in the body of the digital volume. As used herein, a "section reference" is a name of a section listed in the TOC, and a "section heading" is the name of the section appearing in the body of the digital volume at the start of the section. The section reference may be followed by a page number indicating the start of the section. The section heading may be slightly different from the section reference for a given section. TOC pages may or may not include the text "Table of Contents".

The classifier module 304 can use the text information from the text processing module 302 along with various algorithms for determining the TOC pages. These algorithms include identifying pages with text similar to "Table of Contents", identifying pages with several lines ending in numbers, or identifying pages with other various words, phrases, fonts, and layouts indicative of TOC pages. After classifying certain pages as TOC pages, the classifier module 304 can produce a score estimating the accuracy of the classification. For example, a high score indicates that the classified TOC pages are very likely to be actual TOC pages. In one embodiment, if the score is below a certain threshold, a human operator may review the classified TOC pages to verify that those pages are the actual TOC pages. The human operator can then revise the classification if necessary.

The training module 320 trains the classifier module 304 to better classify TOC pages, in one embodiment. The training module 320 can incorporate various machine learning techniques. Initially, several digital volumes can be manually classified by a human operator. The human operator examines the digital volumes and identifies which pages are TOC pages. The text information along with the human classification information for digital volumes are used as input training data for the training module 320. The training module 320 uses the training data to develop rules and algorithms for classifying TOC pages. The training module 320 can extract various features from pages and associate those features with the human classification of the pages. For example, the training module 320 may learn that certain words, phrases, fonts, and layouts tend to indicate TOC pages. These rules and algorithms can then be provided to the classifier module 304 for classifying digital volumes with unknown TOC pages. In one embodiment, at least 100,000 digital volumes are used to produce training data for the training module 320.

The phrase extraction module 306 extracts phrases from the text information of the classified TOC pages. These phrases may be section references, such as chapter titles. The phrase matching module 310, described below, searches for these extracted phrases in the body of the digital volume to find section headings and to determine section boundaries. The phrase extraction module 306 can process the text information of each TOC page line by line, converting each line into a phrase (e.g., a string of characters) and generating a list of phrases. Not all such extracted phrases will contain section references. In one embodiment, certain phrases that are unlikely to be section references, such as "Table of Contents," may be eliminated from the list of extracted phrases. Some section references in the TOC may span multiple lines and as a result are split into multiple extracted phrases.

Since section references listed in the TOC often end with or start with a page number indicating the start page of the section, many extracted phrases may end with or start with a page number. However, relying on the page number provided in the TOC may result in an inaccurate determination of the section start page. For example, an OCR error may result in the page number in the extracted phrase being inaccurate. Also, one or more pages of a digital volume obtained from a printed volume may have been skipped during the scanning process, causing the page numbers of the digital volume to be different than the page numbers indicated in the TOC. As a result, numbers at the end of or start of an extracted phrase may be removed from the phrase so that they are ignored by the phrase matching module. In addition to representing page numbers, these numbers may represent chapter numbers. A "normalized" phrase refers to an extracted phrase that has numbers from its beginning and end removed.

Some digital volumes may not have a TOC, and the classifier module 304 may not identify any TOC pages. In this case, a statistical profile of all font sizes in the digital volume can be constructed, and those phrases that have large font sizes compared to the average font size can be identified as extracted phrases as if they had originated from a TOC. Large font sizes can be considered sizes that exceed some multiple of the standard deviation above the mean of all font sizes in the digital volume. A TOC can also be constructed based on the extracted phrases.

The indexing module 308 creates a word index of the words in the body of a digital volume using the text information from the text processing module 302. The word index can be used to look up the matches of a given word in the body of the digital volume. For example, given a word such as "tangent", the word index provides all of the matches (e.g., page numbers and positions) of the word "tangent" in the digital volume. The word index may also return font size or layout information associated with each match. In one embodiment, the word index can also support the lookup of words similar to a given word. For example, a lookup of "tangent" can produce exact matches and approximate matches with a single letter difference, such as "tamgent." The number of characters that differ in an approximate match is referred to as the distance of the match, and this distance can be returned by the word index along with each approximate match. In this example, "tangent" has a match distance of zero while "tamgent" has a match distance of one. Approximate matching is useful because of possible OCR errors in the text information.

The phrase matching module 310 uses the word index to find matches within the body of a digital volume of the phrases extracted from the TOC pages of the digital volume. The word index can be obtained from the indexing module 308 and the extracted phrases can be obtained from the phrase extraction module 306. Phrases from the TOC pages that are also found in the body of the digital volume are likely to be section headings, and the locations of the phrases in the body of the digital volume are indications of possible section boundaries.

Phrase matching can be performed using the word index by looking up a word from the phrase to determine matching words and then examining adjacent words in each of the matches. The matches from the word index provide the locations (and approximate locations) of matching words in the digital volume. The words immediately preceding and following each matching word can then be identified in linear time to determine if the matching word is part of a specified phrase. Lookups can be performed on multiple words within a single phrase for improved results. For example, one word in the phrase may not return a match (e.g., because of OCR errors or a misprint), but other words may return matches that approximate the phrase.

The phrase matching module 310 can determine a score for each matching phrase indicating the likelihood that the match corresponds to a section heading in the digital volume. The score can be partially based on the quality of the match. For example, the distances of the matches of the individual words in the phrase can be used to determine the quality of the phrase match. Greater match distances can indicate a lower quality match. A lower quality match can also be indicated by a word in the extracted phrase (e.g., the searched phrase) that is not found in the matching phrase or by a word in the matching phrase that is not found in the extracted phrase.

The score of the matching phrase can also be based on the font and layout of the matching phrase. A matching phrase in a large font surrounded by whitespace is more likely to be a section heading and can be given an increased score. A matching phrase can also be given an increased score if it appears on the page indicated by the extracted phrase in the TOC before normalization. As described above, the page number provided at the end of or start of an extracted phrase in the TOC is not relied on for matching; however, if a matching phrase is in fact found on the page indicated by the page number, that matching phrase can be given a higher match score. The page on which a matching phrase is found can be determined by examining the top or bottom of the page for a page number. The phrase matching module 310 can create a list of all matching phrases for each extracted phrase along with a score for each matching phrase.

The match selection module 312 determines the best matching phrase for each extracted phrase based on match scores and ordering constraints. These best matches can be deemed the section headings referenced by the extracted phrases. The locations of the section headings indicate the start pages of the sections (i.e., the section boundaries). Though a higher match score indicates that a matching phrase is more likely a section heading, ordering constraints prevent merely choosing the matching phrase with the highest match score. In one embodiment, the ordering constraints specify that the matching phrases should appear in the body of the digital volume in the same order that the extracted phrases appear in the TOC. An example of determining best matches subject to these ordering constraints is illustrated in FIGS. 4A and 4B.

Figure 4A:
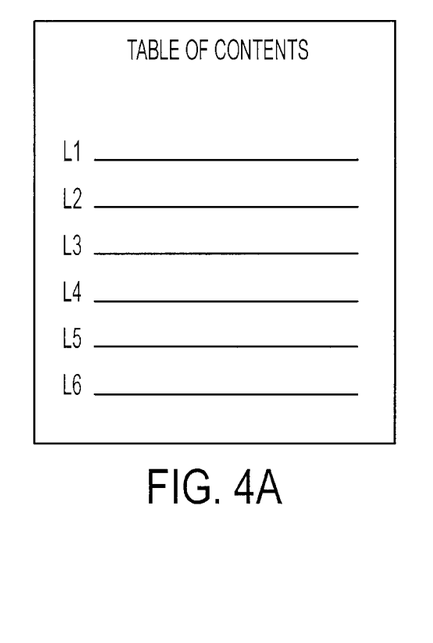
FIG. 4A illustrates a sample table of contents (TOC) page with six extracted phrases L1 to L6, in one embodiment.
Figure 4B:
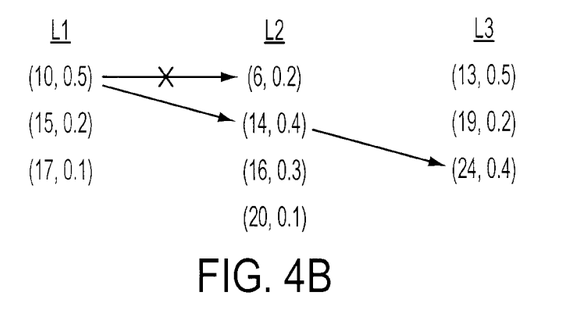
FIG. 4B shows information about the matching phrases for extracted phrases L1, L2, and L3, in one embodiment.

FIG. 4A illustrates a sample TOC page with six extracted phrases L1 to L6, in one embodiment. FIG. 4B shows information about the matching phrases for extracted phrases L1, L2, and L3, in one embodiment. As illustrated in FIG. 4B, extracted phrase L1 has 3 matching phrases, extracted phrase L2 has 4 matching phrases, and extracted phrase L3 has 3 matching phrases in the body of the digital volume. For each matching phrase, the page number of the match and the match score is shown. For example, the first match of phrase L1 is on page 10 and the match score is 0.5.

In the illustrated example, the ordering constraint specifies that the best matches appear in the same order as the extracted phrases in the TOC. For example, if (10, 0.5) is the best match for L1, then (6, 0.2) is unlikely to be the best match for L2, since this would result in phrase L1 appearing before phrase L2 in the TOC but the match for L1 (on page 10) appearing after the match for L2 (on page 6) in the body of the digital volume. This violation of the ordering constraint is indicated in FIG. 4B as a crossed-out arrow. There may be multiple sets of matches that satisfy the ordering constraints. For example, the L1 match of (15, 0.2), the L2 match of (16, 0.3), and the L3 match of (19, 0.2) satisfies the ordering constraint. The set of matches that satisfies the ordering constraint and that has the highest total match score can be selected as the set of best matches. In FIG. 4B, the L1 match of (10, 0.5), the L2 match of (14, 0.4), and the L3 match of (24, 0.4), indicated by arrows, has a total match score of 1.3, which is higher than the total match score of other sets of matches satisfying the ordering constraints. As a result, this set of matches can be chosen as the best set of matching phrases by the match selection module 312.

Because of possible OCR errors or other inconsistencies in the digital volume, certain extracted phrases may not be found anywhere in the body of the digital volume or may not be found in a location that satisfies the ordering constraints. In such cases, a set of best matches that approximately satisfies the ordering constraints may be used. This set of best matches may be determined by considering all predecessors of a particular phrase rather than just the immediate predecessor. For example, when selecting the best matching phrase for L4, the matching phrases of L1, L2, and L3 can be considered for satisfying ordering constraints, rather than just considering the matching phrases of L3.

The match selection module 312 can store information about the determined best matches on the storage device 208. This information can include each extracted phrase, the corresponding best matching phrase, and the locations of both phrases in the digital volume. The extracted phrases can be deemed the section references in the TOC. The best matching phrases can be deemed the corresponding section headings in the body of the digital volume. The locations of the best matching phrases can be deemed the section start pages which indicate section boundaries.

The post-processing module 314 can adjust extracted phrases and best matching phrases determined by the phrase extraction module 306 and match selection module 312. As mentioned above, phrase extraction module 306 may process the TOC pages line-by-line, breaking up a single section reference into multiple extracted phrases. A best match can then be found for each extracted phrase. The post-processing module 314 can combine multiple best matches that are located on the same page. For example, if the best matches for phrases L2 and L3 are found on the same page in sequence, the two matching phrases can be combined into a single matching phrase that likely corresponds to a single section heading. If several matching phrases are found in sequence on the same page with an outlier in the middle, the outlier can be corrected. For example, if the best matches for L2, L3, and L5 are found on the same page with the best match of L4 elsewhere, the L4 match can be ignored, and the matches for L2, L3, and L5 can be combined. The extracted phrases corresponding to the matching phrases can also be combined, since the combined extracted phrases are likely to represent a single section reference.

The post-processing module 314 can also send the determined section references and section headings (e.g., extracted phrases and best matching phrases) to a human reviewer to determine if they are correct. The decision to use a human reviewer can be based on the scores of the best matches and the extent to which the ordering constraints are satisfied.

The presentation module 316 can present the digital volume to a user at the user client, in one embodiment. The presentation module 316 may include a web server for presenting the digital volume. The presentation module 316 can create links from section references (e.g., extracted phrases) in the TOC to corresponding section headings (e.g., best matching phrases) in the body of the digital volume. The user can select these links with a pointing device 214 to navigate from the TOC to a desired section. The presentation module 316 may also provide controls for navigating forward or backward through sections of the digital volume. The presentation module 316 receives section information from the match selection module 312 to enable these section navigation features.

The search module 318 allows users to search a set of digital volumes. The search module 318 can receive a search query including keywords from a user, search the digital volumes for query matches, and return the matches to the user. The search module 318 may receive section information from the match selection module 312 and use this information to affect search results. For example, the search module 318 can more heavily weight section headings in the resulting matches to a search query. Search results that correspond to section headings (e.g., best matching phrases) can be highlighted or presented higher in the search results.

Figure 5:
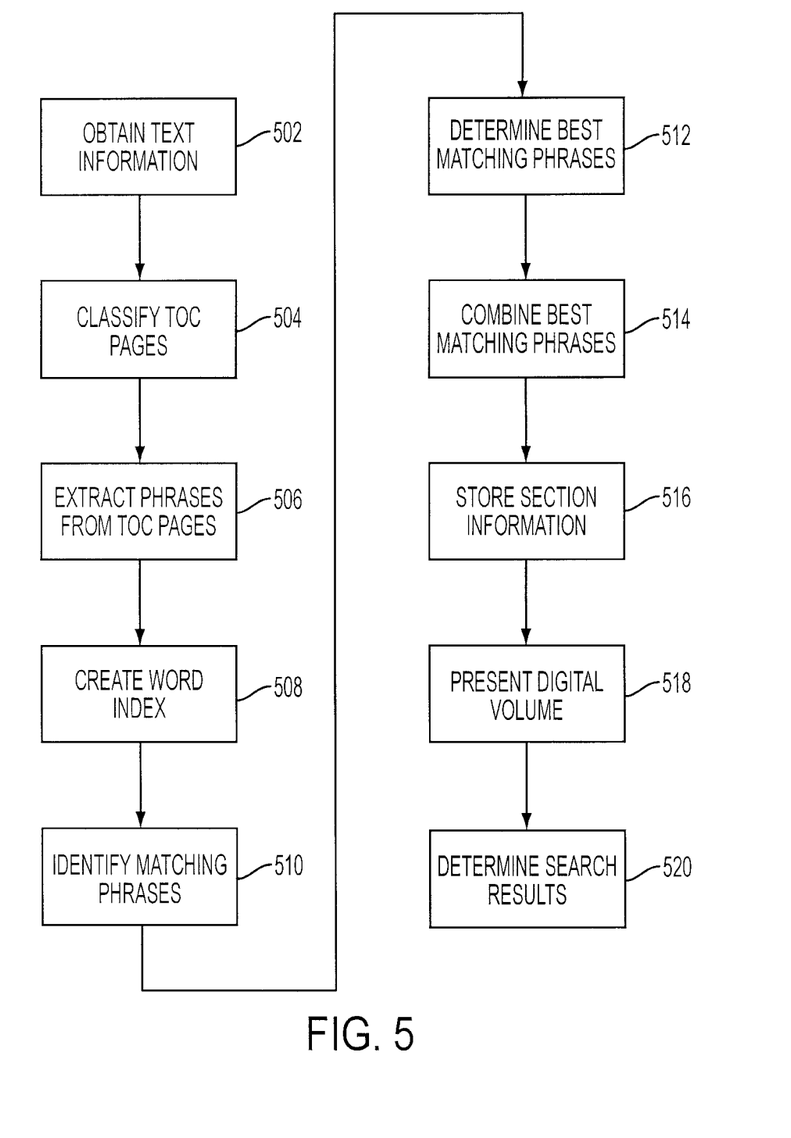
FIG. 5 is a flowchart illustrating a method for determining section information of a digital volume, in one embodiment.

FIG. 5 is a flowchart illustrating a method for determining section information of a digital volume, in one embodiment. Initially, the text processing module 302 obtains 502 text information from the digital volume. The text processing module 302 may perform OCR on page images to obtain the information. The classifier module 304 classifies 504 certain pages as TOC pages based on the text information. The phrase extraction module 306 extracts 506 phrases from the TOC pages. These phrases can be each line of the text of the TOC pages. The indexing module 308 creates 508 an index of the words in the digital volume. The word index can support exact and approximate lookups. The phrase matching module 310 identifies 510 matching phrases in the body of the digital volume that match the extracted phrases from the TOC. Matching phrases can be identified by looking up words from the extracted phrases in the word index.

The match selection module 312 determines 512 the best matching phrases of the identified matching phrases. The determination of the best matching phrases can be based on ordering constraints and match scores associated with the identified matching phrases. The post-processing module 314 combines 514 best matching phrases that are nearly adjacent to each other and that are likely to be a part of the same section heading. The best matching phrases and their locations are deemed to be the section headings and section boundaries. Section information comprising these section heading and boundaries is stored 516. The presentation module 316 presents 518 the digital volume to users, including features for navigating to various sections in the digital volume. The search module 318 determines 520 search results in the digital volume for a search query, giving heavier weight to search results that comprise section headings.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method for determining section information of a digital volume, the method comprising:
determining pages of the digital volume containing a table of contents by applying a classifier to the digital volume, the classifier adapted to use machine learning to recognize references to sections in a body of the digital volume and identify pages of the digital volume containing the section references as the pages containing the table of contents;
and generating a score estimating an accuracy of a classification of a page as containing the table of contents;
extracting phrases from the table of contents of the digital volume;
identifying matching phrases in the body of the digital volume, the matching phrases at least approximately matching the extracted phrases;
determining best matching phrases from the identified matching phrases, the best matching phrases comprising a matching phrase corresponding to each extracted phrase, the determining based at least in part on the ordering of the extracted phrases and the identified matching phrases;
generating section information, the section information comprising section headings and section start locations, the section headings comprising the best matching phrases, and the section start locations indicating starting locations of the sections in the digital volume, the section start locations comprising the locations of the best matching phrases in the digital volume; and
storing the section information.

2. The computer-implemented method of claim 1, wherein identifying matching phrases in the body of the digital volume further comprises:
indexing words of the digital volume to create a word index;
identifying lookup words from the extracted phrases;
looking up the lookup words in the word index to determine matching words, the matching words being exact or approximate matches of the lookup words; and
identifying matching phrases in the body of the digital volume based at least in part on the matching words.

3. The computer-implemented method of claim 1, wherein identifying matching phrases in the body of the digital volume further comprises:
determining match scores associated with the matching phrases, the match scores based at least in part on the similarity of the words in the extracted phrases and the corresponding matching phrases,
and wherein determining best matching phrases from the identified matching phrases is based at least in part on the match scores.

4. The computer-implemented method of claim 3, wherein the match scores are based at least in part on the font or layout of the matching phrases in the digital volume.

5. The computer-implemented method of claim 1, further comprising:
presenting the digital volume to a user, the presented digital volume including user-selectable links from the extracted phrases in the table of contents to corresponding section headings at the corresponding section start locations in the generated section information.

6. The computer-implemented method of claim 1, further comprising:
determining search results from the digital volume responsive to a search query; and
weighting search results containing section headings in the generated section information more heavily than other search results.

7. The computer-implemented method of claim 1, further comprising:
combining nearly adjacent best matching phrases into a section heading and combining corresponding extracted phrases into a section reference.

8. The computer-implemented method of claim 1, wherein the order of the best matching phrases in the body of the digital volume is approximately the same as the order of the extracted phrases in the table of contents.

9. A computer system for determining section information of a digital volume, the system comprising:
a non-transitory computer-readable storage medium storing executable computer program modules comprising:
a classifier module for determining pages of the digital volume containing a table of contents by applying a classifier to the digital volume, the classifier adapted to use machine learning to recognize references to sections in a body of the digital volume and identify pages of the digital volume containing the section references as the pages containing the table of contents;
and generating a score estimating an accuracy of a classification of a page as containing the table of contents;
a phrase extraction module for extracting phrases from the table of contents of the digital volume, the digital volume comprising a plurality of sections;
a phrase matching module for identifying matching phrases in the body of the digital volume, the matching phrases at least approximately matching the extracted phrases; and
a match selection module for:
determining best matching phrases from the identified matching phrases, the best matching phrases comprising a matching phrase corresponding to each extracted phrase, the determining based at least in part on the ordering of the extracted phrases and the identified matching phrases;
generating section information, the section information comprising section headings and section start locations, the section headings comprising the best matching phrases, and the section start locations indicating starting locations of the sections in the digital volume, the section start locations comprising the locations of the best matching phrases in the digital volume; and
storing the section information; and
a processor for executing the computer program modules stored in the computer-readable storage medium.

10. The computer system of claim 9, wherein identifying matching phrases in the body of the digital volume further comprises:
indexing words of the digital volume to create a word index;
identifying lookup words from the extracted phrases;
looking up the lookup words in the word index to determine matching words, the matching words being exact or approximate matches of the lookup words; and
identifying matching phrases in the body of the digital volume based at least in part on the matching words.

11. The computer system of claim 9, wherein identifying matching phrases in the body of the digital volume further comprises:

determining match scores associated with the matching phrases, the match scores based at least in part on the similarity of the words in the extracted phrases and the corresponding matching phrases, and wherein determining best matching phrases from the identified matching phrases is based at least in part on the match scores.

12. The computer system of claim 11, wherein the match scores are based at least in part on the font or layout of the matching phrases in the digital volume.

13. The computer system of claim 9, further comprising:
a presentation module for presenting the digital volume to a user, the presented digital volume including user-selectable links from the extracted phrases in the table of contents to corresponding section headings at the corresponding section start locations in the generated section information.

14. The computer system of claim 9, further comprising:
a search module for:
determining search results from the digital volume responsive to a search query; and
weighting search results containing section headings in the generated section information more heavily than other search results.

15. The computer system of claim 9, further comprising:
a post-processing module for combining nearly adjacent best matching phrases into a section heading and combining corresponding extracted phrases into a section reference.

16. The computer system of claim 9, wherein the order of the best matching phrases in the body of the digital volume is approximately the same as the order of the extracted phrases in the table of contents.

17. A computer program product having a non-transitory computer-readable storage medium having executable computer program instructions recorded thereon, the computer program instructions when executed by a processor causing the computer to determine section information of a digital volume, comprising:
a classifier module for determining pages of the digital volume containing a table of contents by applying a classifier to the digital volume, the classifier adapted to use machine learning to recognize references to sections in a body of the digital volume and identify pages of the digital volume containing the section references as the pages containing the table of contents;
and generating a score estimating an accuracy of a classification of a page as containing the table of contents;
a phrase extraction module for extracting phrases from the table of contents of the digital volume, the digital volume comprising a plurality of sections;
a phrase matching module for identifying matching phrases in the body of the digital volume, the matching phrases at least approximately matching the extracted phrases; and
a match selection module for:
determining best matching phrases from the identified matching phrases, the best matching phrases comprising a matching phrase corresponding to each extracted phrase, the determining based at least in part on the ordering of the extracted phrases and the identified matching phrases;
generating section information, the section information comprising section headings and section start locations, the section headings comprising the best matching phrases, and the section start locations indicating starting locations of the sections in the digital volume, the section start locations comprising the locations of the best matching phrases in the digital volume; and
storing the section information.

18. The computer program product of claim 17, wherein identifying matching phrases in the body of the digital volume further comprises:
indexing words of the digital volume to create a word index;
identifying lookup words from the extracted phrases;
looking up the lookup words in the word index to determine matching words, the matching words being exact or approximate matches of the lookup words; and
identifying matching phrases in the body of the digital volume based at least in part on the matching words.

19. The computer program product of claim 17, wherein identifying matching phrases in the body of the digital volume further comprises:
determining match scores associated with the matching phrases, the match scores based at least in part on the similarity of the words in the extracted phrases and the corresponding matching phrases,
and wherein determining best matching phrases from the identified matching phrases is based at least in part on the match scores.

20. The computer program product of claim 19, wherein the match scores are based at least in part on the font or layout of the matching phrases in the digital volume.

21. The computer program product of claim 17, further comprising:
a presentation module for presenting the digital volume to a user, the presented digital volume including user-selectable links from the extracted phrases in the table of contents to corresponding section headings at the corresponding section start locations in the generated section information.

22. The computer program product of claim 17, further comprising:
a search module for:
determining search results from the digital volume responsive to a search query; and
weighting search results containing section headings in the generated section information more heavily than other search results.

23. The computer program product of claim 17, further comprising:
a post-processing module for combining nearly adjacent best matching phrases into a section heading and combining corresponding extracted phrases into a section reference.

24. The computer program product of claim 17, wherein the order of the best matching phrases in the body of the digital volume is approximately the same as the order of the extracted phrases in the table of contents.

25. A computer-implemented method of determining a location of a section within a digital volume, the method comprising:
determining a portion of the digital volume containing a table of contents by applying a classifier to the digital volume, the classifier adapted to use machine learning to recognize references to sections in a body of the digital volume and identify portions of the digital volume containing the section references as the portion containing the table of contents;
and generating a score estimating an accuracy of a classification of a page as containing the table of contents;
extracting ordered text phrases from the identified portion of the digital volume determined to contain the table of contents, the ordered text phrases referencing a plurality of sections in the body of the digital volume;

identifying ordered text phrases in the body of the digital volume that at least approximately match the extracted text phrases;

determining an identified text phrase that best matches an extracted text phrase responsive at least in part to a match score indicating a quality of a match between the identified text phrase and the extracted text phrase and an ordering constraint determined based on an order of the extracted text phrases and an order of the identified text phrases;

generating section information indicating that a location of the identified best-matching text phrase is a starting location of a section in the body of the digital volume referenced by the extracted text phrase; and storing the section information.

26. The computer-implemented method of claim 1, wherein the classifier identifies the pages containing the table of contents based at least in part on text of the pages and a layout of the pages of the digital volume.

27. The computer-implemented method of claim 1, wherein the classifier identifies the pages containing the table of contents based at least in part on identifying pages having lines ending in numbers.

* * * * *